United States Patent [19]
Jang

[11] Patent Number: 5,755,263
[45] Date of Patent: May 26, 1998

[54] BACKWARD FLOW PREVENTION DEVICE

[75] Inventor: Jae-Young Jang, Suwon, Rep. of Korea

[73] Assignee: Samsung Electronics Co., Ltd., Suwon, Rep. of Korea

[21] Appl. No.: 802,585

[22] Filed: Feb. 19, 1997

[30] Foreign Application Priority Data

Feb. 28, 1996 [KR] Rep. of Korea ............ 96-5110

[51] Int. Cl.$^6$ .................................................. F16K 15/14
[52] U.S. Cl. ............................. 137/853; 137/454.2
[58] Field of Search ............................ 137/853, 454.2

[56] References Cited

U.S. PATENT DOCUMENTS

| | | | |
|---|---|---|---|
| 2,941,541 | 6/1960 | Peras | 137/853 |
| 2,948,297 | 8/1960 | Langdon | 137/853 |
| 2,973,230 | 2/1961 | Eastburg | 137/853 |
| 3,342,208 | 9/1967 | Steffes | 137/853 |
| 3,417,775 | 12/1968 | Smith | 137/853 |
| 3,448,766 | 6/1969 | Schule | 137/853 |
| 4,134,424 | 1/1979 | Zeyra et al. | 137/853 |
| 5,305,786 | 4/1994 | Debush | 137/853 |

Primary Examiner—Denise L. Ferensic
Assistant Examiner—Joanne Y. Kim
Attorney, Agent, or Firm—Burns, Doane, Swecker & Mathis, L.L.P.

[57] ABSTRACT

A backward flow prevention device includes a body through which a fluid passage extends, the fluid passage intersecting an outer periphery of the body to form a fluid port. A flexible tube includes a first end mounted on the outer periphery of the body to extend across the fluid port, and a second, open end. The body is adapted to be mounted in a fluid conducting tube. When fluid flows through the fluid passage and exits the fluid port, it forces the tube away from the fluid port, whereby the fluid can flow through the tube and out the open end thereof. When the fluid flows backwards in the pipe, the fluid pressure causes the tube to be pressed against, and close, the fluid port.

6 Claims, 2 Drawing Sheets

BACKWARD FLOW PREVENTION DEVICE

BACKGROUND OF THE INVENTION

1. Field of the Invention

This invention relates to a backward flow (backflow) prevention device in a water purifier.

2. Description of the Prior Art

As shown in FIG. 1, a conventional backward flow prevention device consists of hindrance means 3 (i.e. a one-way check valve) installed in a pipe 1 for preventing a backward flow of water. The hindrance means 3 comprises a body 5 having a fluid passage 5a therein, a cap member 7 installed in an end of the body 5, a ball member 9 inserted in the body 5 for closing a through hole 7a formed in the cap member 7 to thereby shut off the fluid passage, and a spring member 11 installed at a side of the ball member for 9 pushing the ball 9 in a backflow of fluid so that the ball 9 closes the through hole 7a tightly.

As shown in FIG. 1, the cap member 7 has a dish shaped recess 7b at an end of the through hole 7a, formed slantly for contacting the ball 9 easily, wherein the ball 9 is made of rubber or the like.

In the conventional backward flow prevention device constructed as above, water flows along the through hole 7a as shown by an arrow in FIG. 1 and compresses the spring 11 when fluid (water) flows in a normal direction. The ball member 9 is now isolated from the dish-shaped hole 7b forming a gap therebetween, so that the fluid passes through the gap to be discharged through a through hole 5b.

Meanwhile, when water (fluid) flows backward, and when the water flows into the through hole 5b, the spring member 11 makes the ball 9 contact the dish-shaped recess 7b to thereby shut off the fluid passage and to prevent a backward flow.

However, there is a problem in the conventional backward flow prevention device thus constructed in that the ball member cannot contact the dish-shaped recess tightly when the ball member is irregularly formed, thereby causing the ball to malfunction. Further, there is another problem in that an elastic coefficient of the spring tends to change according to the direction of movement of fluid flow, which direction is frequently changed left and right in the pipe, thereby causing the spring to malfunction.

Accordingly, it is an object of the present invention to provide a fluid backward flow prevention device which can prevent the fluid from flowing backward in a body.

SUMMARY OF THE INVENTION

The above and other objects are achieved according to the invention of a fluid backward flow prevention device, the device comprising: a body adapted to be mounted in a pipe; and a flexible tube installed tightly at an external side of the body for being bent freely by hydraulic pressure so as to close the fluid passage when fluid flows backward.

BRIEF DESCRIPTION OF THE DRAWINGS

For a fuller understanding of the nature and objects of the invention, reference should be made to the following detailed description taken in conjunction with the accompanying drawings in which.

DESCRIPTION OF THE PREFERRED EMBODIMENT

The preferred embodiment of the present invention will now be described in detail with reference to the accompanying drawings.

Figure 1:
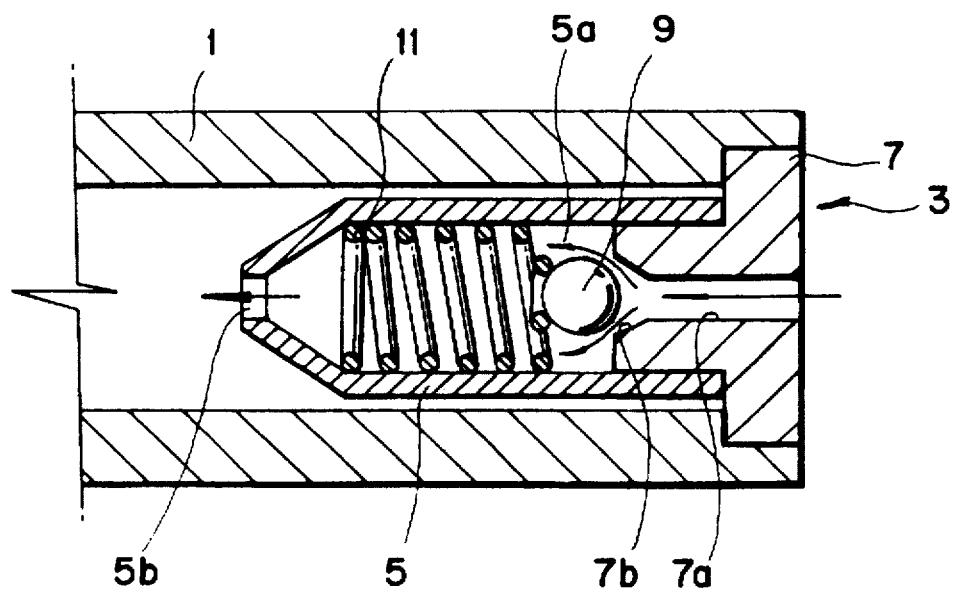
FIG. 1 is a cross-sectional view of a conventional fluid backward flow prevention device.
Figure 2:
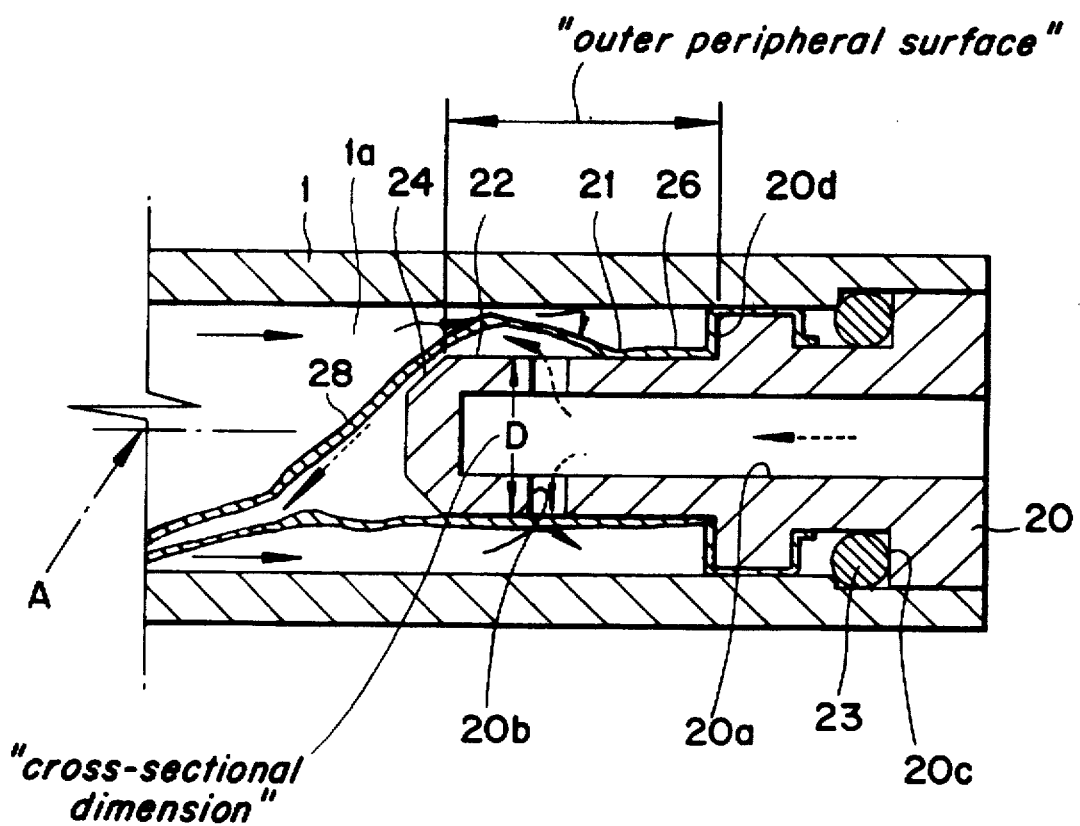
FIG. 2 is a cross-sectional view of a fluid backward flow prevention device according to the present invention.

As shown in FIG. 2, a fluid backward flow prevention device includes a body 20 installed in one end of fluid passage 1a formed in a pipe 1, and a tube 21 installed on the outer wall of the body 20 for allowing fluid to flow in a normal direction and preventing fluid from flowing backward.

The body 20 has a longitudinal inlet passage 20a formed therein and at least one discharging hole 20b at a side thereof through which fluid infused along fluid passage 20a can be discharged, and a sealing member 23 installed between the body 20 and pipe 1 for preventing leakage of fluid. The discharging hole(s) 20b intersects an outer peripheral surface 22 of the body to form a fluid port. The outer peripheral surface 22 extends parallel to a longitudinal axis A of the body and intersects a front bevel surface 24.

As shown in FIG. 2, a break away prevention boss 20c is formed by an enlarged head at an end of the body 20 so that the sealing member 23 is prevented from dislodgement, and a protrusion 20d is disposed at a side of the outer surface of the body 20 for a rear section 26 of the tube 21 to be fixed thereto. And the tube 21 is made of a flexible material. A front section 28 of the tube extends forwardly past the outer peripheral surface 22 by a distance at least as great as the cross-sectional dimension D of the body 20. The front end of the front section forms a fluid outlet opening.

The operation of the fluid backward flow prevention device thus constructed according to the embodiment of the present invention will be described as follows.

First of all, when the fluid flows in a normal direction, shown by broken-line arrows in FIG. 2, fluid infused through the fluid passage 20a is discharged through a discharging hole(s) 20b formed at a side of the body 20, and the discharged fluid flows out through a gap which is formed by flexing of the tube when the tube is being pushed outwardly by the hydraulic pressure.

While fluid flows reversely as shown by a solid arrow in FIG. 2, the tube 21 becomes bent out of alignment with the axis A by the hydraulic pressure, and closes the discharging hole(s) 20b to prevent a backward flow of fluid.

The backward flow prevention device thus constructed can be applied to any product using fluid such as a fluid purifier.

There is an advantage in the backward flow prevention device of the present invention, in that fewer elements are used whereby the device is simplified, thereby preventing the backward flow and prolonging its life.

What is claimed is:

1. A backward flow prevention device, comprising:

a body adapted to be mounted in a fluid pipe, the body defining a longitudinal axis and having a fluid passage formed therethrough, the fluid passage intersecting an outer peripheral surface of the body to form a fluid port therein, the outer peripheral surface extending substantially parallel to the axis and defining a cross-sectional dimension of the body; and a flexible tube having front and rear sections, the rear section secured on the body and extending across the fluid port, and a fluid outlet opening disposed in a front end of the front section, the tube being sufficiently flexible to be displaced away from the fluid port by fluid exiting the fluid port, enabling the fluid to travel forwardly through the tube and out of the front end thereof, the front section extending forwardly past the outer peripheral surface by a distance at least as great as the cross-sectional dimension and being bent substantially out of alignment with the axis by a backward flow of fluid which presses the rear section of the tube against the fluid port to close the fluid port.

2. The backward flow prevention device according to claim 1 wherein the fluid passage includes a longitudinal inlet portion and a transverse discharge portion extending from the inlet portion to the fluid port.

3. The backward flow prevention device according to claim 1 wherein the body includes another end having an enlarged head forming a radial boss, and a sealing ring extending around the body adjacent the boss.

4. The backward flow prevention device according to claim 3 wherein the body includes a radially projecting annular protrusion around which the rear section of the flexible tube is mounted, the seal ring disposed between the boss and the protrusion.

5. The backward flow prevention device according to claim 1 wherein the body includes a radially projecting annular protrusion around which the rear section of the flexible tube is mounted.

6. In combination, a fluid pipe and a backward flow prevention device mounted in the fluid device and comprising:

a body mounted in the fluid pipe, the body defining a longitudinal axis and having a fluid passage formed therethrough, the fluid passage intersecting an outer peripheral surface of the body to form a fluid port therein, the outer peripheral surface extending substantially parallel to the axis and defining a cross-sectional dimension of the body; and a flexible tube having front and rear sections, the rear section secured on the body and extending across the fluid port, and a fluid outlet opening disposed in a front end of the front section, the tube being sufficiently flexible to be displaced away from the fluid port by fluid exiting the fluid port, enabling the fluid to travel forwardly through the tube and out of the front end thereof, the front section extending forwardly past the outer peripheral surface by a distance at least as great as the cross-sectional dimension and being bent substantially out of alignment with the axis by a backward flow of fluid which presses the rear section of the tube against the fluid port to close the fluid port.

* * * * *